Figure 1:
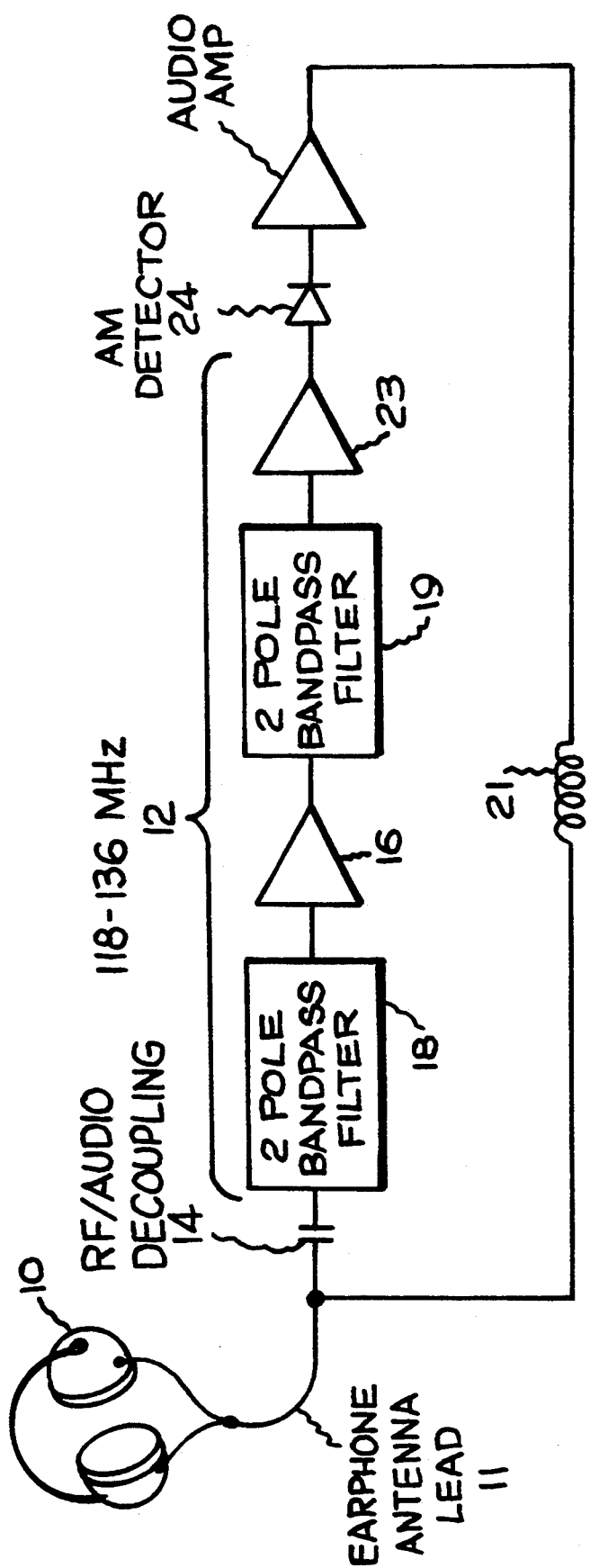

United States Patent [19]
Ramsey

[11] Patent Number: 5,361,405
[45] Date of Patent: Nov. 1, 1994

[54] AIRCRAFT BAND RADIO RECEIVER WHICH DOES NOT RADIATE INTERFERING SIGNALS

[75] Inventor: John G. Ramsey, Pittsford, N.Y.

[73] Assignee: Ramsey Electronics, Inc., Victor, N.Y.

[21] Appl. No.: 619,830

[22] Filed: Nov. 30, 1990

Related U.S. Application Data

[63] Continuation of Ser. No. 407,005, Sep. 14, 1989, abandoned.

[51] Int. Cl.⁵ .......................... A04B 1/22; H04B 7/00
[52] U.S. Cl. .................................. 455/150.1; 455/66; 455/270
[58] Field of Search ............... 455/131, 150, 270, 280, 455/169, 161, 74, 98, 95, 150.1, 169.1, 169.2, 161.1, 161.2, 161.3; 381/14

[56] References Cited

U.S. PATENT DOCUMENTS

| | | | |
|---|---|---|---|
| 2,171,679 | 9/1939 | Wohlfarth et al. | 455/150 |
| 2,280,187 | 4/1942 | Case | 455/150 |
| 2,360,726 | 10/1944 | Setchell | 455/270 |
| 2,535,063 | 12/1950 | Halstead | 455/270 |
| 4,290,144 | 9/1981 | Webb | 455/63 |
| 4,398,304 | 8/1983 | Fathauer et al. | 455/168 |
| 4,419,766 | 12/1983 | Goeken et al. | 455/226 |
| 4,520,507 | 5/1985 | Moon | 455/131 |
| 4,569,084 | 2/1986 | Takahama | 455/131 |
| 4,726,072 | 2/1988 | Yamashita et al. | 455/315 |
| 4,727,594 | 2/1988 | Ruppel | 455/209 |
| 4,893,316 | 1/1990 | Janc et al. | 455/324 |

Primary Examiner—Curtis Kuntz
Assistant Examiner—Lisa Charouel
Attorney, Agent, or Firm—M. Lukacher

[57] ABSTRACT

A broadband radio receiver monitors transmissions over a broadband of frequencies, and especially over the aircraft band, between aircraft and control towers or between the cockpit and ground stations at an airport. The radio utilizes an earphone having a lead which provides an antenna. The lead is AC coupled to an amplifier having band-pass filters connected to the input and to output thereof to provide selectivity while passing the entire band. An AM detector is connected to the output filter and produces an audio signal which is coupled, via an RF blocking inductor, to the earphone by way of the earphone lead. A miniaturized self-contained radio is therefore provided which does not utilize a local oscillator or other radiating signal generator and may be used on board or nearby aircraft without violating regulations for the use of electronic equipment.

2 Claims, 2 Drawing Sheets

AIRCRAFT BAND RADIO RECEIVER WHICH DOES NOT RADIATE INTERFERING SIGNALS

This is a continuation, of application Ser. No. 407,005, filed Sep. 14, 1989.

The present invention relates to radio systems and particularly to radio receivers for receiving AM transmissions over a predetermined broadband, such as the aircraft communications band (118 to 136 MHz).

The invention is especially suitable for use by passengers or other persons who wish to monitor transmissions in the vicinity of an airport or on board commercial passenger aircraft without violating regulations as to radiated signals. The invention is also applicable wherever a predetermined band of frequencies is to be received, particularly where it is not desirable to tune the radio to specific frequencies in the band.

Anyone waiting for an airplane or trapped in an aircraft sitting on a runway awaiting take off clearance has, at one time or another, become quite anxious as to the status of the aircraft and as to the possibility of the aircraft returning to the gate or otherwise interfering with his or her travel plans. Regulations concerning electronic equipment on commercial aircraft forbid the use of conventional radios, all of which use superheterodyne circuits with local oscillators of various types. Moreover, it is desirable to monitor signals, the exact frequency of which is unknown. Therefore, the need to tune the radio over the band is undesirable and prevents the practical application of conventional radios for the purpose.

Another requirement of radios which are desired to operate to monitor transmissions over a broad band is that they be extremely small in size and low in cost. Complex electronic circuits which have heretofore been used in radio equipment and separate speakers and antennaes used with such circuits, have made them impractical for such purposes.

Accordingly, it is the principal object of the present invention to provide an improved radio system for receiving transmissions, particularly AM transmissions over a predetermined broad band, such as the band over which aircraft communications is carried out (118 to 136 MHz).

Ancillary objects of the present invention are to provide an improved radio system in which the above-mentioned drawbacks and disadvantages of conventional radios are obviated.

Briefly described, an improved radio system which is provided in accordance with the invention, is adapted for receiving AM transmissions over a predetermined broad band such as the band used for aircraft communications (118 to 136 MHz). The radio has a broadband input circuit tuned to pass the predetermined band and a demodulator circuit connected to the output of the input circuit for producing an audio signal in response to ally such transmissions. Preferably the system utilizes an earphone, the lead from which functions both as an antenna and to carry the audio signals which are transduced by the earphone into audible outputs. The user of the radio system can then hear communications of the type which are transmitted between the cockpit of an aircraft, the control tower and other locations, as well as with personnel in an airport.

Figure 2:
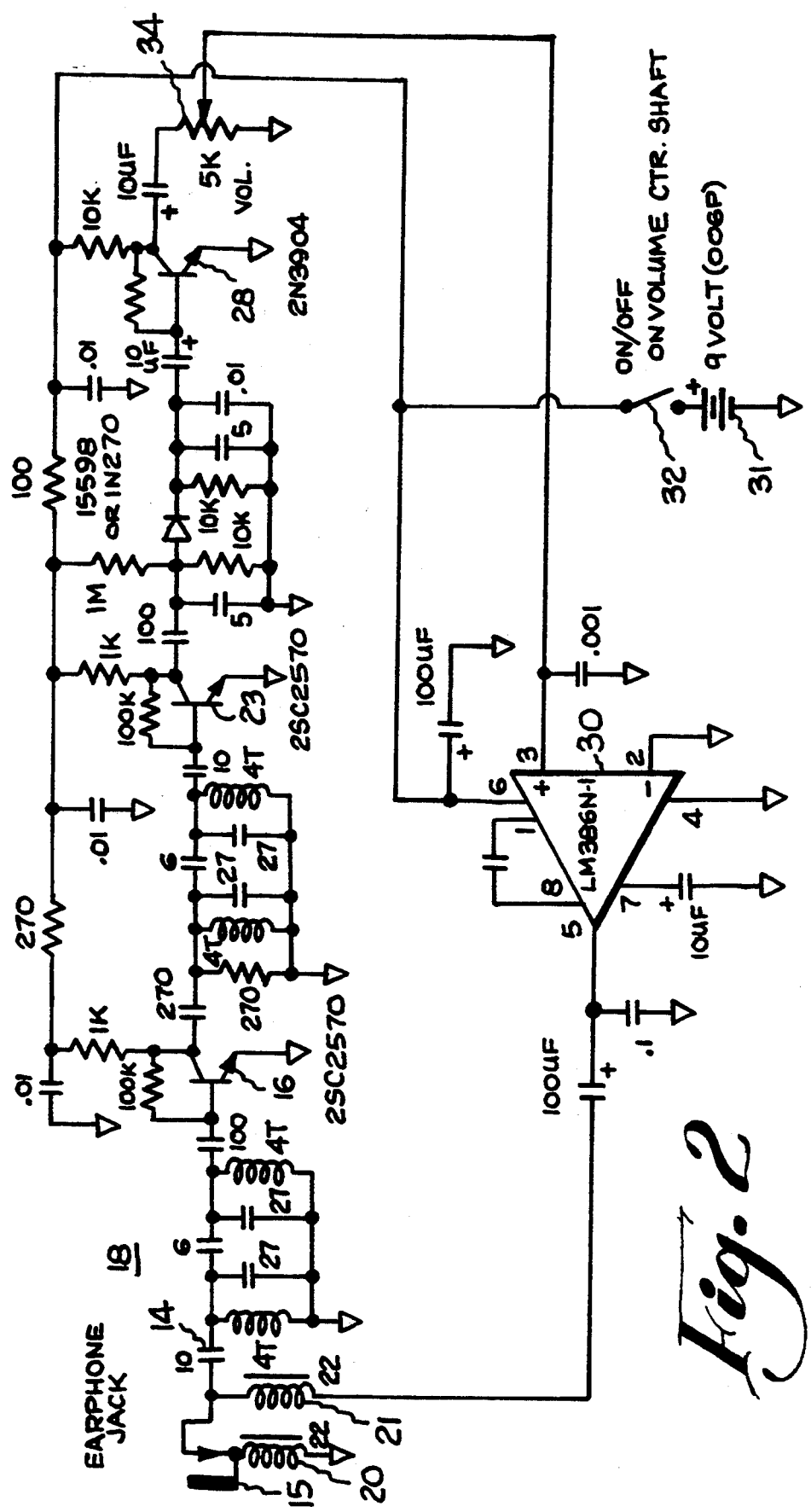

The foregoing and other objects, features and advantages of the invention as well as a presently preferred embodiment thereof will become more apparent from a reading of the following description in connection with the accompanying drawings in which:

FIG. 1 is a block diagram of a radio system for monitoring aircraft transmission in accordance with the invention; and FIG. 2 is a schematic diagram of the radio system shown in FIG. 1.

Referring first to FIG. 1 there is shown an earphone 10 of conventional design having two leads, one of which is connected to ground via an inductor (choke) having high reactance at RF frequency. This choke is shown at 20 in FIG. 2 and is connected to one side of earphone jack 15 into which the antenna leads are plugged via the male part of the jack which is not shown. The other lead serves as both an audio signal line and as an antenna. It is connected to a broadband input circuit 12 via a coupling capacitor 14, which passes the RF picked up on the lead 11 from the earphone while blocking audio signals which are applied to the earphone from the output of the receiver system. These audio signals are coupled via another inductor or choke 21 which is also shown in FIG. 2 connected to the ungrounded side of the earphone jack 15.

The input circuit 12 has at least one amplifier 16. This amplifier is a transistor amplifier which is shown in detail in FIG. 2. In order to pass the broadband of interest and to provide selectivity against interfering signals below and above the band (the FM band on the low end of the predetermined band (118 to 136 MHz)) and the 2-way radio and TV bands at the high end of the band of interest, a pair of 2-pole band-pass filters each tuned to pass the band of interest (118 to 136 MHz) 18 & 19 are connected to the input and output of the amplifier 16. These band-pass filters 18 and 19 are shown in detail in FIG. 2. In FIG. 2 the values of the capacitors in picofarads is shown adjacent to each capacitor. The value of the resistors in ohms or killiohms is shown adjacent to each resistor. The inductors are designated by numbers of turns (T) of 28 gauge wire, wound closely spaced to define $\frac{1}{8}''$ diameter air coils. The presently preferred transistors and integrated circuits are also indicated by type number. It will be appreciated that these values and arrangement of circuits is presented for purposes of illustration and not of limitation, and for presentation of the best mode now known for practicing the invention. Changes within the scope of the invention will undoubtedly suggest themselves to those skilled in the art and may be made without departing from the invention.

The input circuit also includes another buffer amplifier 23. The output from the amplifier 23 is applied to a demodulator circuit, the principal elements of which are a diode detector 24 and an audio amplifier 26. As shown in FIG. 2 this audio amplifier may be a two-stage amplifier having a low power stage 28 and a high power earphone driver stage 30, which is a commercial integrated circuit amplifier. The high power stage 30 provides the audio signal which is fed through the inductor 21 and then to the earphone 10.

It will be apparent that no local oscillators are needed, nor is any tuning of the receiver needed in order to receive signals which are broadcast over the 118 to 136 MHz band. The receiver is operated by a battery 31. The only controls are an on-off switch 32 and a potentiometer 34, which provides a volume control. It will be apparent that the receiver may be packaged in an extremely small space, for example, 50×175×10 millimeters.

I claim:

1. A radio system for receiving AM transmissions over a predetermined broadband of RF frequencies such as broadcast over an aircraft communications band (118-136 MHz) which comprises a broadband input circuit having circuits which pass or are tuned to pass the predetermined frequencies, a demodulator circuit connected to an output of said input circuit for producing an audio signal in response to any such transmissions, an earphone having two leads, means for AC coupling one of said leads to said input circuit which passes said RF frequencies and blocks said audio signal, first means for coupling said audio signal to said earphone via said one lead which passes said audio signal while blocking said RF frequencies, and second means for coupling a return circuit for said audio signal to the other of said leads which passes said audio signal while blocking said RF frequencies.

2. The system according to claim 1 wherein said AC coupling means comprises a capacitor having sufficient reactance at audio frequencies to block said audio signal, and said first and second audio signal coupling means each comprises an inductor having sufficient reactance to clock said RF frequencies.

* * * * *